United States Patent
Jeon et al.

(10) Patent No.: US 11,713,791 B1
(45) Date of Patent: Aug. 1, 2023

(54) HYBRID ELECTRIC VEHICLE AND TOUCHPOINT LEARNING METHOD THEREFOR

(71) Applicants: HYUNDAI MOTOR COMPANY, Seoul (KR); KIA CORPORATION, Seoul (KR)

(72) Inventors: Jae Woo Jeon, Uiwang-si (KR); Weon Jae Lee, Suwon-si (KR); Gi Young Kwon, Seoul (KR); Dae Won Yang, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/943,962

(22) Filed: Sep. 13, 2022

(30) Foreign Application Priority Data

May 4, 2022 (KR) .................. 10-2022-0055313

(51) Int. Cl.
*F16D 48/06* (2006.01)

(52) U.S. Cl.
CPC .... *F16D 48/066* (2013.01); *F16D 2500/1026* (2013.01); *F16D 2500/1066* (2013.01); *F16D 2500/10406* (2013.01); *F16D 2500/10412* (2013.01); *F16D 2500/3065* (2013.01); *F16D 2500/3066* (2013.01); *F16D 2500/3067* (2013.01); *F16D 2500/50266* (2013.01); *F16D 2500/50281* (2013.01); *F16D 2500/70406* (2013.01); *F16D 2500/70454* (2013.01)

(58) Field of Classification Search
CPC . F16D 2500/50866; F16D 2500/50281; F16D 2500/50266; F16D 2500/3066
See application file for complete search history.

(56) References Cited

U.S. PATENT DOCUMENTS

| | | | | |
|---|---|---|---|---|
| 6,001,044 A | * | 12/1999 | Amendt | F16D 48/066 701/67 |
| 7,204,786 B2 | * | 4/2007 | Takagi | F16H 61/061 477/94 |
| 10,316,906 B2 | | 6/2019 | Yoon et al. | |

(Continued)

FOREIGN PATENT DOCUMENTS

| | | |
|---|---|---|
| JP | 2000094973 A | 4/2000 |
| JP | 2013119280 A | 6/2013 |

(Continued)

*Primary Examiner* — Timothy Hannon
(74) *Attorney, Agent, or Firm* — Lempia Summerfield Katz LLC

(57) ABSTRACT

A hybrid electric vehicle (HEV) includes an engine, a first motor directly connected to the engine through a first shaft, a second motor directly connected to a second shaft, and an engine clutch of which one end is connected to the first shaft and the other end is connected to the second shaft so as to selectively connect the first shaft and the second shaft. The (HEV) includes a first controller unit configured to control each of the first motor and the second motor and a second controller unit configured to determine whether a preconfigured touch point learning condition is satisfied, control the first and second motors to respective first and second speeds when the learning condition is satisfied, and learn a touch point of the engine clutch on the basis of a torque change of the first motor or the second motor.

11 Claims, 4 Drawing Sheets

(56) References Cited

U.S. PATENT DOCUMENTS

| | | | |
|---|---|---|---|
| 2014/0067174 A1* | 3/2014 | Park .................... | B60W 20/40 |
| | | | 903/902 |
| 2014/0378258 A1 | 12/2014 | Kim et al. | |
| 2017/0159729 A1* | 6/2017 | Sakamoto ............. | F16D 48/066 |
| 2017/0166196 A1* | 6/2017 | Park ..................... | B60W 10/02 |
| 2018/0347647 A1 | 12/2018 | Yoon et al. | |
| 2019/0013721 A1 | 1/2019 | Lim et al. | |
| 2020/0180655 A1 | 6/2020 | Lee et al. | |
| 2022/0025942 A1* | 1/2022 | Enders ................. | B60W 10/02 |

FOREIGN PATENT DOCUMENTS

| | | |
|---|---|---|
| KR | 20130037924 A | 4/2013 |
| KR | 20180131676 A | 12/2018 |
| KR | 20210118611 A | 10/2021 |

\* cited by examiner

HYBRID ELECTRIC VEHICLE AND TOUCHPOINT LEARNING METHOD THEREFOR

CROSS-REFERENCE TO RELATED APPLICATION(S)

This application is based on and claims priority under U.S.C. 119 to Korean Patent Application No. 10-2022-0055313, filed on May 4, 2022, in the Korean Intellectual Property Office, the disclosure of which is incorporated by reference herein in its entirety.

BACKGROUND

1. Field of the Disclosure

The present disclosure relates to a hybrid electric vehicle and a touchpoint learning method therefor, wherein touchpoints are learned by adjusting the engagement hydraulic pressure of an engine clutch in a stepwise manner, thereby shortening the touchpoint learning time and improving the learning accuracy.

2. Description of the Prior Art

Recently, in line with increasing interest in preserving the environment, there has been increasing use of ecofriendly vehicles that use electric motors as power sources. Examples of ecofriendly vehicles, also referred to as motorized vehicles, include hybrid electric vehicles (HEV) and electric vehicles (EV).

In general, a HEV using a parallel hybrid power train may have an engine clutch disposed between the engine and the driving motor in order to selectively connect the engine and the driving motor. However, if continuous use of the engine clutch, in which the clutchplates contact each other, wears the engine clutch, the touchpoint at which torque is transmitted may be gradually changed. Such a change in the touchpoint caused by wear commonly increases the interval or distance between clutchplates. Thus, the touchpoint cannot be reached unless an engagement hydraulic pressure greater than the engagement hydraulic pressure corresponding to the previously learned touchpoint is applied.

Therefore, if the touchpoint requires an engagement hydraulic pressure greater than the previously learned point, it is critical to accurately identify the touchpoint because the touchpoint cannot be reached with the existing engagement hydraulic pressure.

In general, an engine clutch touchpoint learning system uses engine power when the car is stationary.

For example, if the engine clutch touchpoint is learned when the engine of a HEV is on, learning proceeds using the revolutions per minute (RPM) when the engine is idle and when the driving motor RPM is about 700. The timepoint at which the absolute value of the amount of change in motor torque reaches a preconfigured or predetermined value or higher is learned as the engine clutch touchpoint. The learning is then completed.

However, there is a problem in that, if the engine is off for touchpoint learning, the engine may be started forcibly. Further, even if the engine is off, fuel loss may occur without driving. In addition, learning proceeds while the engine is idle, a long time is thus necessary to stabilize the idle condition, and irregular signals degrade the touchpoint learning accuracy.

The above description regarding background technologies has been made only to enhance understanding of the background of the present disclosure. Thus, the above description is not to be deemed by those of ordinary skill in the art to correspond to already-known prior art.

SUMMARY

The present disclosure provides a hybrid electric vehicle and a touchpoint learning method therefor, wherein touchpoints are learned by adjusting the engagement hydraulic pressure of an engine clutch in a stepwise manner such that touchpoints can be learned after starting the motor while the engine is off. According to the present disclosure, the touchpoint learning time can be shortened through fast stabilization with reference to the engine shaft clutch speed through a first or second motor. Further, the touchpoint learning accuracy can be improved by more stably maintaining the engine shaft clutch speed through the first or second motor.

The technical subjects pursued in the present disclosure may not be limited to the above-mentioned technical subjects. Other technical subjects, which are not mentioned should be clearly understood, through the following description, by those of ordinary skill in the art to which the present disclosure pertains.

In accordance with an aspect of the present disclosure, a hybrid electric vehicle according to an embodiment includes: an engine; a first motor directly connected to the engine through a first shaft; a second motor directly connected to a second shaft; an engine clutch of which one end is connected to the first shaft and the other end is connected to the second shaft so as to selectively connect the first shaft and the second shaft; a first controller unit configured to control each of the first motor and the second motor; and a second controller unit. The second controller unit is configured to determine whether a preconfigured touch point learning condition is satisfied, control the first motor to have a first speed and the second motor to have a second speed when the learning condition is satisfied, and learn a touch point of the engine clutch on the basis of a torque change of the first motor or the second motor by changing an engagement hydraulic pressure of the engine clutch in a stepwise manner.

The first controller unit may control each of the first motor and the second motor on the basis of a required speed of the first motor and the second motor received from the second controller unit.

The preconfigured touch point learning condition may include at least one of a vehicle gear condition, a brake on/off condition, or a battery charge state condition.

The second controller unit may determine that the preconfigured touch point learning condition is satisfied when a vehicle gear is in park or the P stage, a brake is off, and a battery minimum charge state is satisfied.

The second controller unit may change an engagement hydraulic pressure when a rotation speed of the first motor is maintained at a first speed and a rotation speed of the second motor is maintained at a second speed.

The first speed and the second speed may be different from each other.

The first controller unit and the second controller unit may control a rotation speed of motors in an engine off state and learn a touch point of the engine clutch, respectively.

The second controller unit may configure multiple steps having a predetermined pressure difference before and after an engagement hydraulic pressure corresponding to a current touch point of the engine clutch and apply the multiple steps from a low engagement hydraulic pressure among the configured multiple steps in a stepwise manner.

The second controller unit may learn the engagement hydraulic pressure, as a touch point, of a corresponding step when a torque change rate or a torque change amount exceeding a reference value occurs in one step among the configured multiple steps.

When a torque change is not detected in any step among the configured multiple steps, the second controller unit may configure a step having a highest hydraulic pressure among the configured steps as a reference step to configure multiple steps before and after the reference step.

In accordance with another aspect, a method of learning a touch point of a hybrid electric vehicle includes: determining whether a preconfigured touch point learning condition is satisfied; when the learning condition is satisfied, controlling each of a first motor at a first speed and a second motor at a second speed; changing an engagement hydraulic pressure of an engine clutch in a stepwise manner; and learning a touch point of the engine clutch on the basis of a torque change of the first motor or the second motor.

In the changing engagement hydraulic pressure of an engine clutch in a stepwise manner, the engagement hydraulic pressure may be changed when a rotation speed of the first motor is maintained at a first speed and a rotation speed of the second motor is maintained at a second speed.

In the changing engagement hydraulic pressure of an engine clutch in a stepwise manner, multiple steps having a predetermined pressure difference before and after an engagement hydraulic pressure corresponding to a current touch point of the engine clutch may be configured and applied from a low engagement hydraulic pressure among the configured multiple steps in a stepwise manner.

In the learning the touch point of the engine clutch, an engagement hydraulic pressure may be learned as a touch point of a corresponding step when a torque change rate or a torque change amount exceeding a reference value occurs in one step among the configured multiple steps.

In the learning the touch point of the engine clutch, when a torque change is not detected in any step among the configured multiple steps, the second controller unit may configure a step having a highest hydraulic pressure among the configured steps as a reference step to configure multiple steps before and after the reference step again.

A hybrid electric vehicle and a touchpoint learning method therefor according to the present disclosure are advantageous. Touchpoints are learned by adjusting the engagement hydraulic pressure of an engine clutch in a stepwise manner such that touchpoints can be learned after starting the motor while the engine is off. Additionally, the touchpoint learning time can be shortened through fast stabilization with reference to the engine shaft clutch speed through a first or second motor. Also, the learning accuracy can be improved by more stably maintaining the engine shaft clutch speed through the first or second motor.

Advantageous effects obtainable from the present disclosure may not be limited to the above mentioned effects. Other effects, which are not mentioned should be clearly understood, through the following descriptions, by those of ordinary skill in the art to which the present disclosure pertains.

DETAILED DESCRIPTION OF THE EMBODIMENTS

Figure 1:
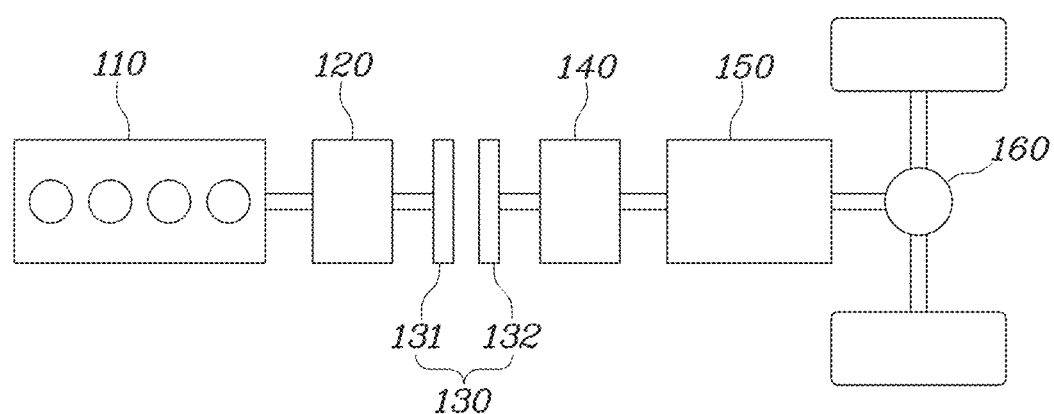
FIG. 1 shows an example of a power train configuration of a hybrid electric vehicle according to an embodiment of the present disclosure.

Hereinafter, embodiments disclosed in the present specification are described in detail with reference to the accompanying drawings. The same or similar elements are given the same and similar reference numerals, so duplicate descriptions thereof have been omitted. The terms "module" and "unit" used for the elements in the following description are given or interchangeably used in consideration of only the ease of writing the specification, and do not have distinct meanings or roles by themselves. In addition, in relation to describing the embodiments disclosed in the present specification, when it is determined that a detailed description of the relevant known technology would unnecessarily obscure the gist of the present disclosure, a detailed description thereof has been omitted. Further, the accompanying drawings are provided only to enhance understanding of the embodiments disclosed in the present specification. Thus, the technical spirit disclosed herein is not limited to the accompanying drawings. It should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in context.

As used herein, the expressions "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof. When a component, device, element, or the like of the present disclosure is described as having a purpose or performing an operation, function, or the like, the component, device, or element should be considered herein as being "configured to" meet that purpose or perform that operation or function.

A unit or a control unit included in names such as a motor control unit (MCU) and a hybrid control unit (HCU) are merely terms widely used for naming a controller configured to control a specific function of a vehicle but do not mean a generic function unit. For example, in order to control a function that a control unit is responsible for, each control unit may include: a communication device configured to communicate with a sensor or another control unit; a memory configured to store an operation or operating system, a logic command, or input/output information; and at least one processor configured to perform determination, calculation, decision or the like which are required for controlling the responsible function.

Before describing a method of learning a touch point of a hybrid electric vehicle according to embodiments of the present disclosure, a control system, and a configuration of a hybrid electric vehicle applicable to the embodiments are first described.

FIG. 1 shows an example of a power train configuration of a hybrid electric vehicle according to an embodiment of the present disclosure.

FIG. 1 shows a power train of a hybrid electric vehicle (HEV) employing a parallel-type hybrid system in which two motors 120 and 140 and an engine clutch 130 are mounted between an engine 110 (an internal combustion engine (ICE)) and a transmission 150. The parallel-type hybrid system has the motor 140 continuously connected to an input terminal of the transmission 150, and thus may be called a transmission mounted electric drive (TMED) hybrid system.

A first motor 120 of the two motors 120 and 140 may be disposed between the engine 110 and one end of the engine clutch 130. An engine shaft of the engine 110 and a first motor shaft of the first motor 120 may be directly connected to each other so as to continuously rotate together.

The second motor 140 may have a larger output compared to the first motor 120. The second motor 140 may function as a driving motor. In addition, the first motor 120 may function as a starter motor configured to crank the engine 110 when the engine 110 is starting, recollect rotation energy of the engine 110 through power generation when the engine is turned off, and perform power generation with power of the engine 110 when the engine 110 is driven.

In the hybrid electric vehicle including the power train shown in FIG. 1, when a driver steps on an accelerator after starting (for example, HEV ready), the second motor 140 may be driven by using power of a battery (not shown) first in a state in which the engine clutch 130 is opened. Accordingly, the wheels are moved by the power of the second motor 140, having passed the transmission 150 and a final drive (FD) 160 (i.e., an electric vehicle (EV) mode). When the vehicle is slowly accelerated and needs more power, the first motor 120 operates to crank the engine 110.

When a rotation speed difference between the engine 110 and the second motor 140, after the engine 110 is started, falls within a predetermined range, the engine clutch 130 is engaged such that the engine 110 and the second motor 140 rotate together (i.e., transition from an EV mode to a HEV mode). Accordingly, through a torque blending process, the output of the second motor 140 decreases and the output of the engine 110 increases, thus satisfying required torque of a driver or vehicle. In the HEV mode, the engine 110 may satisfy most of the required torque, and the difference between the engine torque and the required torque may be compensated through at least one of the first motor 120 and the second motor 140. For example, when the engine 110 outputs torque higher than the required torque considering efficiency of the engine 110, the first motor 120 or the second motor 140 may generate power by the engine torque surplus. Further, when the engine torque is less than the required torque, at least one of the first motor 120 and the second motor 140 outputs the insufficient or deficient torque.

When a predetermined engine off condition such as speed reduction of a vehicle is satisfied, the engine clutch 130 is opened and the engine 110 is stopped (i.e., transition from the HEV mode to the EV mode). The battery is charged through the second motor 140 by using driving force of the wheel when decelerating. This is called braking energy regeneration or regenerative braking.

Generally, step-variable transmission, a multidisc clutch, or, for example, a dual clutch transmission (DCT) may be used for transmission 150.

Figure 2:
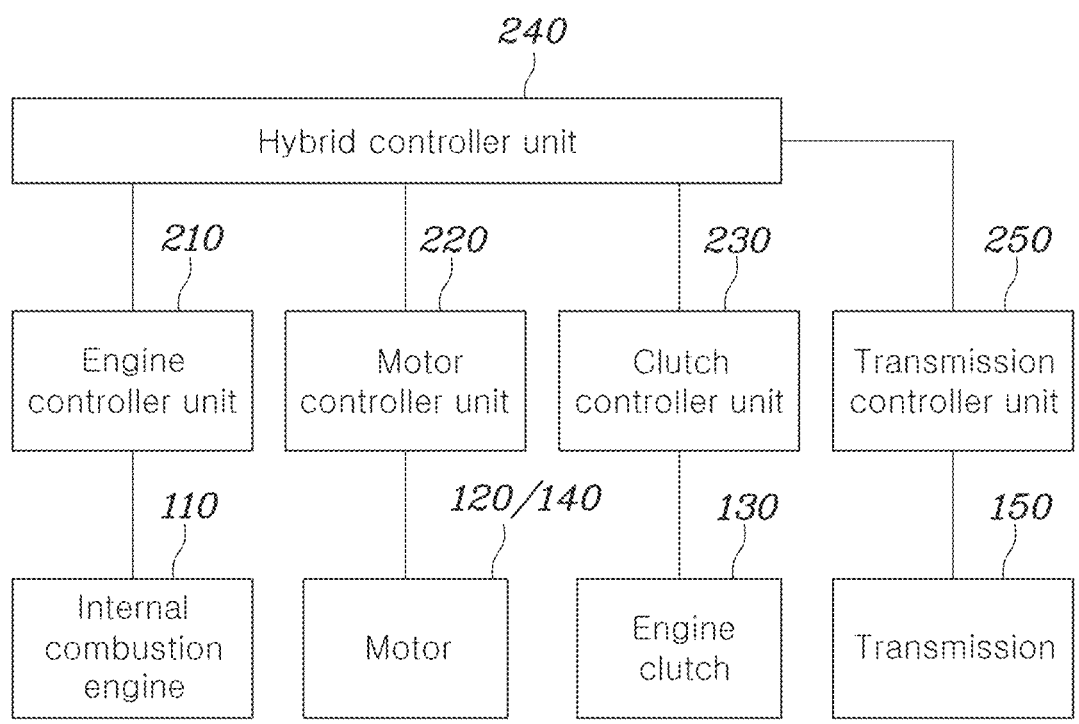
FIG. 2 shows an example of a control system configuration of a hybrid electric vehicle according to an embodiment of the present disclosure.

FIG. 2 shows an example of a control system configuration of a hybrid electric vehicle according to an embodiment of the present disclosure.

Referring to FIG. 2, in the hybrid electric vehicle to which embodiments of the present disclosure may be applied, an internal combustion engine 110 may be controlled by an engine controller unit 210, torque of the first motor 120 and the second motor 140 may be controlled by a motor controller unit 220 (MCU), and the engine clutch 130 may be controlled by a clutch controller unit 230. Here, the engine controller unit 210 may be also referred to as an engine management system (EMS). In addition, the transmission controller unit 250 may control the transmission 150.

The motor controller unit 220 may control a gate drive unit (not shown) by a control signal in a pulse width modulation (PWM) form on the basis of a motor angle, phase voltage, phase current, required torque, or the like of each motor 120 and 140. The gate drive unit may control an inverter (not shown) for driving each motor 120 and 140 according thereto.

Each controller unit may be connected to a hybrid controller unit 240, which is an upper controller unit or high level control unit and controls the overall power train. The hybrid controller unit 240 may control a mode switching process. Thus, each controller unit may provide, to the hybrid controller unit (HCU) 240, information required for control of the engine clutch during driving mode change according to the control of the hybrid controller unit 240 or shifting gears, and/or information required for engine stop control, or may perform an operation according to a control signal.

For example, the hybrid controller unit 240 may determine whether to perform a transition between EV and HEV modes or charge depleting (CD) and charge sustaining (CS) modes (in the case of a plug-in HEV (PHEV)) according to driving condition of the vehicle. To this end, the hybrid controller unit may determine an open time point of the engine clutch 130 and perform a hydraulic control when the engine clutch is open. In addition, the hybrid controller unit 240 may determine a state (lock-up, slip, open, etc.) of the engine clutch 130 and control a fuel injection stopping time point of the engine 110. Furthermore, the hybrid controller unit may transfer, to the motor controller unit 220, a torque command for controlling torque of the first motor 120 for the engine stopping control, so as to control engine rotation energy recovery. The hybrid controller unit 240 may determine conditions of each driving source 110, 120, and 140 for satisfying the required torque, determine required driving force to be shared by each driving source 110, 120, and 140, and transfer a torque command to the controller unit 210 and 220 controlling each driving source.

It should be apparent to a person of ordinary skill in the art that the connection relationships between the controller units and the function/division of the controller units are illustrative and that the names of the controller units are not limited thereto. For example, the hybrid controller unit 240 may be implemented such that the functions thereof are alternatively provided by any one of the controller units other than the hybrid controller unit. The hybrid controller unit 240 may be implemented such that the functions thereof are distributed and provided by two or more of the other controller units.

It should be apparent to a person of ordinary skill in the art that the configuration of FIG. 1 and FIG. 2 are merely examples of a hybrid vehicle and a hybrid vehicle applicable to an embodiment is not limited to the structure.

According to an embodiment of the present disclosure, a system is provided that is capable of learning a touch point even when an engine 110 of a vehicle is turned off by learning a touch point through a first motor 120 and a second motor 140 of a hybrid electric vehicle.

In a description below, for convenience, the motor controller unit is referred to as a first controller unit 220 and the hybrid controller unit is referred to as a second controller unit 240.

First, the engine clutch 130 may include a first clutch end 131 connected to a first shaft and a second clutch end 132 connected to a second shaft. Here, the first shaft may mean a shaft connected to the engine 110 and the first motor 120, and the second shaft may mean a shaft connected to the second motor 140 and the transmission 150. A touch point or kiss point may mean a point at which one clutch end is moved to another clutch end by an engagement hydraulic pressure and at which contact between two clutch ends 131, 132 starts to occur such that torque of the first shaft starts to be transferred to the second shaft. For example, the first clutch end 131 may be moved to the second clutch end 132 side by the engagement hydraulic pressure.

Generally, the touch point learning in a hybrid electric vehicle may be performed during a vehicle end of line (EOL) operation or during traveling.

The touch point learning may be performed when a touch point learning condition is determined to be satisfied. There may be multiple touch point learning conditions. When multiple touch point learning conditions are configured, the touch point learning is performed when all the configured multiple touch point learning conditions are satisfied.

Here, the reasons for configuring the touch point learning condition are to exclude external variables during the touch point learning when a preconfigured learning condition is satisfied and to perform the touch point learning only with torque changes of the first motor 120 or the second motor 140 according to stepwise change in the engagement hydraulic pressure of the engine clutch 130.

The touch point learning conditions for starting touch point learning may include a vehicle gear condition, a brake on/off condition, a battery charge state condition, an automatic transmission (A/T) fluid temperature (oil temperature inside the gearbox), and a clutch temperature condition.

It may be determined by the second controller unit that a condition for touch point learning during traveling of a vehicle is satisfied when a vehicle gear is in P stage, a brake is off, an A/T fluid temperature is equal to or higher than a minimum temperature, and a temperature of a clutch satisfies a predetermined temperature condition. Here, the A/T fluid temperature may be equal to or higher than at least degrees and the temperature of a clutch may be equal to or less than 240-280 degrees.

It should be apparent to a person of ordinary skill in the art that the conditions for touch point learning of a vehicle described above are merely examples and that the conditions for touch point learning are not necessarily limited thereto. The conditions for touchpoint learning are not limited by any conditions as long as they contribute to exclusion of external variables during touch point learning.

Thereafter, when the second controller unit 240 determines whether the preconfigured touch point learning condition is satisfied and determines that the touch point learning condition is satisfied, the touch point learning may begin.

When the touch point learning begins, the first controller unit 220 (i.e., motor controller unit 220) may control a rotation speed of each of the first motor 120 and the second motor 140 on the basis of a required speed of the first motor 120 and the second motor 140 received from the second controller unit 240 (i.e., hybrid controller unit 240).

More specifically, the second controller unit 240 may determine a required speed of the first motor 120 and the second motor 140 for the touch point learning of the engine clutch 130 on the basis of whether the predetermined touch point learning condition is satisfied or a current state of a vehicle. Here, the second controller unit 240 may differently or independently determine a first speed which is a required speed of the first motor 120 and a second speed which is a required speed of the second motor 140. This is because in the case where the first speed and the second speed are the same, it is difficult to cause a torque change sufficient to detect a touch point when contact between clutch plates 131, 132 occurs.

Meanwhile, when the first controller unit 220 controls a rotation speed of each of the first motor 120 and the second motor 140, speed information may be transferred to the second controller unit 240 to allow the second controller unit 240 to identify the rotation speed of the first motor 120 and the second motor 140.

In addition, the second controller unit 240 may change the engagement hydraulic pressure when the rotation speed of the first motor 120 is maintained at the first speed and the rotation speed of the second motor 140 is maintained at the second speed. A state in which the rotation speed is maintained means a state in which the rotation speed of the first motor 120 and the rotation speed of the second motor 140, which are controlled by the first controller unit 220 as different speeds, are constant and stable.

In case of the motor 120, 140, revolutions per minute (RPM) control is easy compared to the engine 110, and rotation is stable as no explosion or internal combustion is involved in driving. Therefore, compared to a conventional learning method in which a first shaft is rotated by power of the engine 110, RPM of the first motor 120 and the second motor 140 may be stabilized quickly during touch point learning. Thus, the touch point learning time may be reduced and learning accuracy may be also enhanced due to regular rotation.

Figure 3:
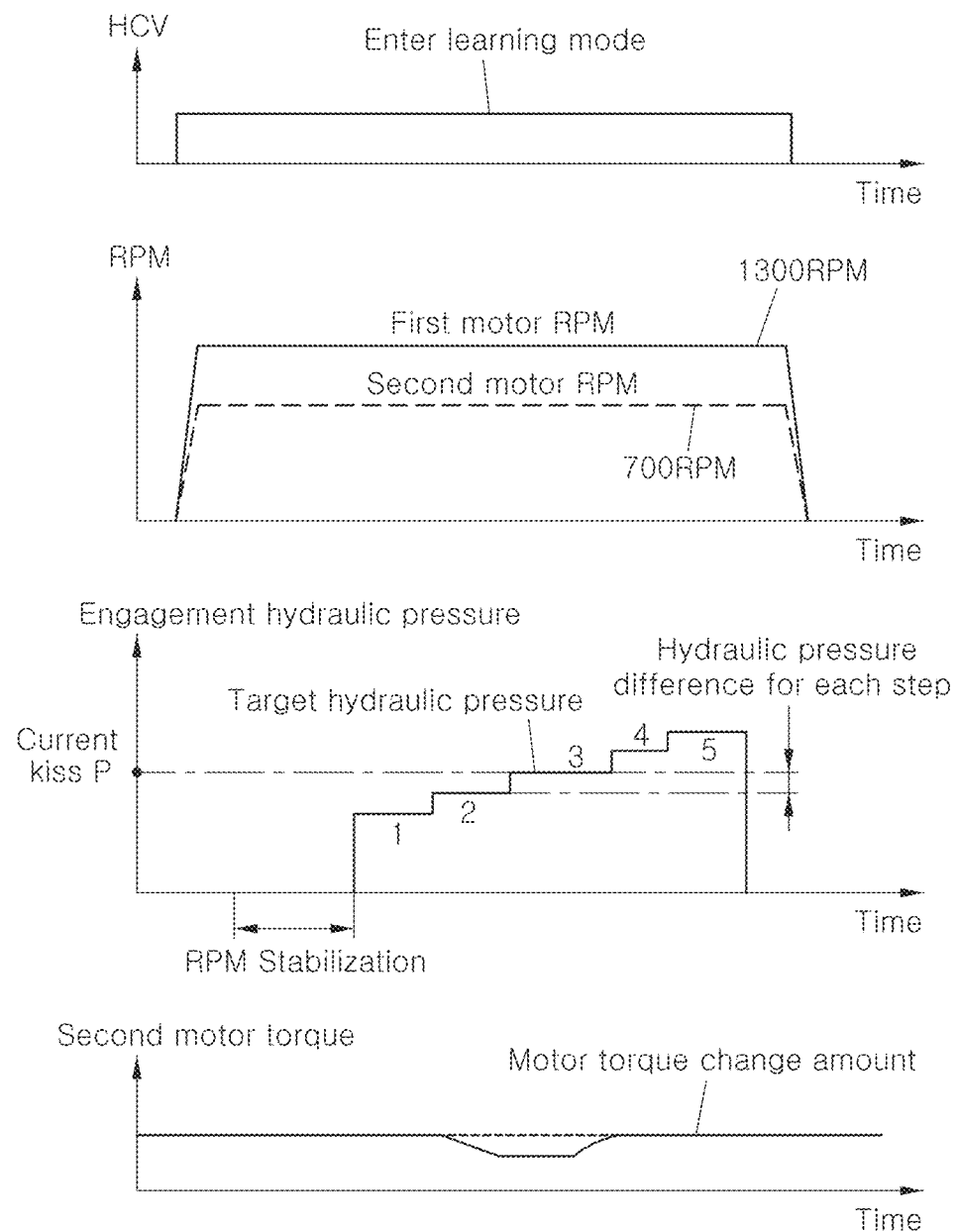
FIG. 3 is a graph illustrating an example of a touch point learning form according to an embodiment of the present disclosure.

FIG. 3 is described on the basis of or with respect to an operation of the first controller unit 220 and the second controller unit 240 described above. FIG. 3 includes graphs illustrating an example of a touch point learning form according to an embodiment of the present disclosure.

As shown in the uppermost or first graph, the second controller unit 240 determines whether the touch point learning condition is satisfied and enters a learning mode when the learning condition is determined to be satisfied. After entering the learning mode, as shown in the second graph (e.g., second from the top), the first controller unit 220 may control a speed of each of the first motor 120 and the second motor 140.

Thereafter, as shown in the third graph (e.g., third from the top), the second controller unit 240 changes the engagement hydraulic pressure of the engine clutch 130 in a stepwise manner when it is determined that the rotation speed of the first motor 120 is maintained at the first speed and the rotation speed of the second motor 140 is maintained at the second speed, so as to be stabilized. As shown in the fourth graph (e.g., fourth from the top), a time point in which a torque change of the first motor 120 or the second motor 140 is equal to or higher than a reference value is learned as a touch point of the engine clutch 130 so as to end the learning. The touch point is periodically learned. Lastly, when the second controller unit 240 determines that the touch point learning of the engine clutch 130 is completed, the speed of the first motor 120 and the second motor 140 are reduced to 0 RPM and the learning is terminated.

Hereinafter, a method for learning the touch point of the engine clutch 130 on the basis of the torque change of the first motor 120 or the second motor 140 caused by the second controller unit 240 is described in detail.

First, a method for configuring steps of the engagement hydraulic pressure of the engine clutch 130 by the second controller unit 240 is described.

The second controller unit 240 may configure a total of five steps with a pressure difference of 0.2 bar in each step on the basis of a current touch point of the engine clutch 130 to detect a torque transfer time point of a motor. Here, although it may be assumed or the present disclosure is described such that there is the total of the five steps of pressure with a pressure difference of 0.2 bar, this merely is an example. The present disclosure is not necessarily limited thereto.

The second controller unit 240 configures multiple steps having a predetermined pressure difference before and after an engagement hydraulic pressure corresponding to the current touch point of the engine clutch 130 and applies the engagement hydraulic pressure from a low engagement hydraulic pressure among the configured multiple steps in a stepwise manner (i.e., with the engagement pressure increasing in a stepwise manner). For example, the touch point of the engine clutch 130 may be detected by configuring an engagement hydraulic pressure corresponding to the current touch point of the engine clutch 130 as a third step which is an intermediate step among the five steps. Further the touch point of the engine clutch may be determined by configuring each target engagement hydraulic pressure for two lower steps as first and second steps and for two higher steps as fourth and fifth steps, respectively, and by gradually raising an engagement hydraulic pressure for the engagement hydraulic pressure of the engine clutch 130 from the first step to the fifth step.

In a case where the engagement hydraulic pressure of the engine clutch 130 is changed in a stepwise manner, when a torque change rate or torque change amount exceeds a reference value in one step among the configured multiple steps, the second controller unit 240 may learn the engagement hydraulic pressure of the corresponding step as a touch point. The torque change may be a torque change of the first motor 120 or a torque change of the second motor 140. In some examples, torque changes of both the first motor 120 and the second motor 140 may be considered.

Here, if a torque change is not detected in any step among the configured multiple steps, the second controller unit 240 may configure a step having the highest hydraulic pressure among the configured steps as a reference step and may configure multiple steps before and after the reference step. For example, when (1) the engagement hydraulic pressure of the engine clutch 130 is configured to five steps, (2) the touch point of the engine clutch 130 is detected by raising the engagement hydraulic pressure from a first step to a fifth step, and (3) a torque change rate or a torque change amount does not exceed a reference value to the fifth step, the engagement hydraulic pressure of the engine clutch 130 may be changed in a stepwise manner by configuring the fifth step of previously configured steps as a third step. The third step is a reference step for configuring next engagement hydraulic pressure steps of the engine clutch 130 and including two upper steps and two lower steps to make five steps in total.

Figure 4:
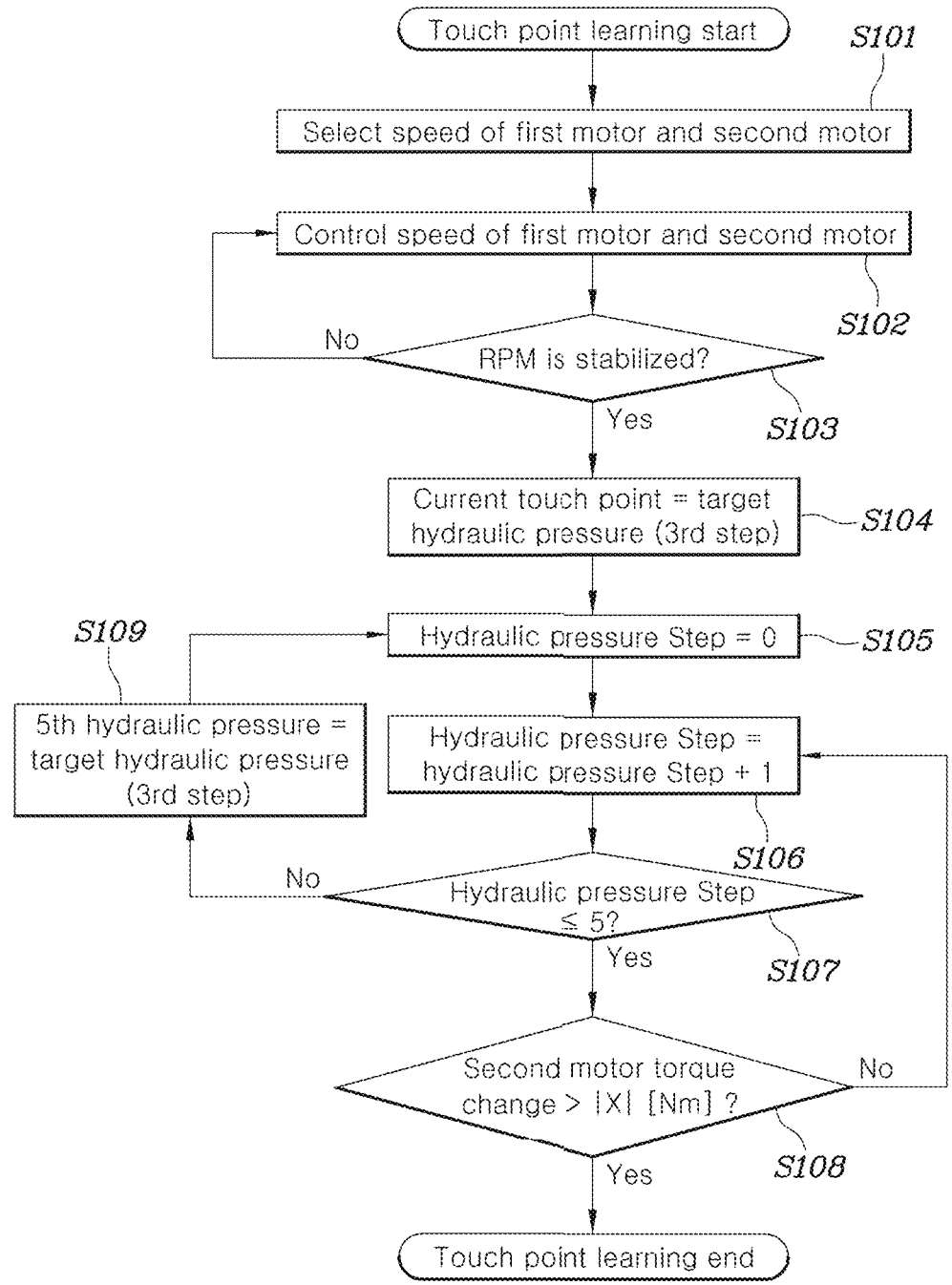
FIG. 4 shows a flowchart of operating a method of learning a touch point of a hybrid electric vehicle according to an embodiment of the present disclosure.

The above-described method for learning a touch point of a hybrid electric vehicle by the first controller unit 220 and the second controller unit 240 is summarized in a flow chart as shown in FIG. 4.

FIG. 4 shows a flowchart of operating a method of learning a touch point of a hybrid electric vehicle according to an embodiment of the present disclosure. FIG. 4 illustrates a flowchart according to a logic, in which it is determined whether the preconfigured touch point learning condition is satisfied. When the learning condition is satisfied, the speeds of the first motor 120 and the second motor 140 are controlled to be a first speed and a second speed, respectively, the engagement hydraulic pressure of the engine clutch 130 is changed in a stepwise manner, and the touch point of the engine clutch 130 is learned on the basis of a torque change of the first motor 120 or the second motor 140.

First, when the second controller unit 240 determines whether the preconfigured touch point learning condition is satisfied and determines that the touch point learning condition is satisfied, the touch point learning begins. The second controller unit 240 may determine a required speed of the first motor 120 and the second motor 140 for the touch point learning of the engine clutch 130 on the basis of whether the predetermined touch point learning condition is satisfied or a current state of a vehicle.

When the touch point learning begins, the first controller unit 220 may select a rotation speed of each of the first motor 120 and the second motor 140 on the basis of a required speed of the first motor 120 and the second motor 140 received from the second controller unit 240 (S101) and control the first motor 120 and the second motor 140 to rotate at a first speed and a second speed, respectively (S102).

Thereafter, the second controller unit 240 may determine whether the rotation speed of the first motor 120 is maintained at the first speed and the rotation speed of the second motor 140 is maintained at the second speed, i.e., whether the motor speed is stable (S103). As described above, the touch point learning may be performed in the engine (110) off state by learning the touch point of the engine clutch 130 while the rotation speed of the motor is maintained. Accordingly, the learning accuracy may be improved by detecting the torque change of the first motor 120 or the second motor 140 more accurately.

The engagement hydraulic pressure of the engine clutch 130 may be changed in a stepwise manner when the rotation speed of the first motor 120 is maintained at the first speed and the rotation speed of the second motor 140 is maintained at the second speed. Specifically, the second controller unit 240 configures multiple steps having a predetermined pressure difference before and after an engagement hydraulic pressure corresponding to the current touch point of the engine clutch 130 (S104).

Thereafter, the steps or changes are applied in a stepwise manner from a low engagement hydraulic pressure among the configured multiple steps. For example, the engagement hydraulic pressure may be configured in a total of five steps by configuring an engagement hydraulic pressure corresponding to the current touch point of the engine clutch 130 as a third step, which is an intermediate step among the five steps. The five steps may include the current touch point of the engine clutch and target hydraulic pressures of two upper or higher steps and two lower steps. The touch point of the engine clutch 130 may be detected by gradually raising the engagement hydraulic pressure of the engine clutch 130 from the first step to the fifth step (S105-S107).

In the case that the engagement hydraulic pressure of the engine clutch 130 is changed in a stepwise manner, when a torque change rate or torque change amount exceeds a reference value in one step among the configured multiple steps (YES in S108), the second controller unit 240 may learn the engagement hydraulic pressure of the corresponding step as a touch point.

Here, if a torque change is not detected in any step among the configured multiple steps (NO in S108), the second controller unit 240 may configure a step having the highest hydraulic pressure among the configured steps as a reference step and may configure multiple steps before and after the reference step again (S109). For example, when the engagement hydraulic pressure of the engine clutch 130 is configured to five steps, the touch point of the engine clutch 130 is detected by raising the engagement hydraulic pressure from a first step to a fifth step. If the torque change is not detected in any step to the fifth step, the engagement hydraulic pressure of the engine clutch 130 may be changed in a stepwise manner by configuring the fifth step of previously configured steps as a third step. The third step is a reference step for configuring the next or additional engagement hydraulic pressure steps of the engine clutch 130 and including two upper or higher steps and two lower steps to make five steps in total.

The present disclosure as described above may be implemented as code in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Further, the above detailed description should not be construed as limiting in any sense but should be considered in an illustrative sense in all aspects. The scope of the present disclosure should not be determined by reasonable interpretation of the appended claims, rather all changes and modifications within the equivalent scope of the present disclosure fall within the scope of the present disclosure.

BRIEF DESCRIPTION OF REFERENCE NUMERALS

110: engine
120: first motor
130: engine clutch
131: first clutch end
132: second clutch end
140: second motor
150: transmission
210: engine controller unit
220: motor controller unit (first controller unit)
230: clutch controller unit
240: hybrid controller unit (second controller unit)
250: transmission controller unit

What is claimed is:

1. A hybrid electric vehicle comprising:
   an engine;
   a first motor directly connected to the engine through a first shaft;
   a second motor directly connected to a second shaft;
   an engine clutch of which one end is connected to the first shaft and the other end is connected to the second shaft so as to selectively connect the first shaft and the second shaft;
   a first controller unit configured to control each of the first motor and the second motor; and
   a second controller unit configured to determine whether a preconfigured touch point learning condition is satisfied, control the first motor to have a first speed and the second motor to have a second speed when the learning condition is satisfied, and learn a touch point of the engine clutch on the basis of a torque change of the first motor or the second motor by changing an engagement hydraulic pressure of the engine clutch in a stepwise manner,
   wherein the second controller unit configures multiple steps having a predetermined pressure difference before and after the engagement hydraulic pressure corresponding to a current touch point of the engine clutch,
   wherein the second controller unit learns the engagement hydraulic pressure, as the touch point, of a corresponding step when a torque change rate or a torque change amount exceeding a reference value occurs in one step among the configured multiple steps, and
   wherein, when a torque change is not detected in any step among the configured multiple steps, the second controller unit configures a step having a highest hydraulic pressure among the configured steps as a reference step to configure multiple steps before and after the reference step.

2. The hybrid electric vehicle of claim 1, wherein the first controller unit controls each of the first motor and the second motor on the basis of a required speed of the first motor and the second motor received from the second controller unit.

3. The hybrid electric vehicle of claim 1, wherein the preconfigured touch point learning condition comprises at least one of a vehicle gear condition, a brake on/off condition, or a battery charge state condition.

4. The hybrid electric vehicle of claim 3, wherein the second controller unit determines that the preconfigured touch point learning condition is satisfied when a vehicle gear is in P stage, a brake is off, and a battery minimum charge state is satisfied.

5. The hybrid electric vehicle of claim 1,
   wherein the second controller unit changes the engagement hydraulic pressure when a rotation speed of the first motor is maintained at a first speed and a rotation speed of the second motor is maintained at a second speed.

6. The hybrid electric vehicle of claim 5, wherein the first speed and the second speed are different from each other.

7. The hybrid electric vehicle of claim 1, wherein the first controller unit and the second controller unit control a rotation speed of motors in an engine off state and learn a touch point of the engine clutch, respectively.

8. The hybrid electric vehicle of claim 1, wherein the second controller unit
   applies the multiple steps from a low engagement hydraulic pressure among the configured multiple steps in a stepwise manner.

9. A method of learning a touch point of a hybrid electric vehicle, the method comprising:

determining whether a preconfigured touch point learning condition is satisfied;

when the learning condition is satisfied, controlling each of a first motor at a first speed and a second motor at a second speed;

changing an engagement hydraulic pressure of an engine clutch in a stepwise manner; and learning the touch point of the engine clutch on the basis of a torque change of the first motor or the second motor, wherein, in changing the engagement hydraulic pressure of the engine clutch in the stepwise manner, multiple steps having a predetermined pressure difference before and after an engagement hydraulic pressure corresponding to a current touch point of the engine clutch are configured, wherein, in learning the touch point of the engine clutch, the engagement hydraulic pressure is learned as a touch point of a corresponding step when a torque change rate or a torque change amount exceeding a reference value occurs in one step among the configured multiple steps, and wherein, in learning the touch point of the engine clutch, when the torque change is not detected in any step among the configured multiple steps, the second controller unit configures a step having a highest hydraulic pressure among the configured steps as a reference step to configure multiple steps before and after the reference step.

10. The method of claim 9, wherein, in changing the engagement hydraulic pressure of the engine clutch in the stepwise manner, the engagement hydraulic pressure is changed when a rotation speed of the first motor is maintained at the first speed and a rotation speed of the second motor is maintained at the second speed.

11. The method of claim 9, wherein, in changing the engagement hydraulic pressure of the engine clutch in the stepwise manner, the configured multiple steps are applied from a low engagement hydraulic pressure among the configured multiple steps in a stepwise manner.

* * * * *